United States Patent [19]

Hotchkiss

[11] 4,337,577
[45] Jul. 6, 1982

[54] DECLINATION TRANSPOSER

[75] Inventor: Noel J. Hotchkiss, Elbridge, N.Y.

[73] Assignee: Declitractor, Inc., Elbridge, N.Y.

[21] Appl. No.: 141,320

[22] Filed: Apr. 18, 1980

[51] Int. Cl.³ ............................................. G01C 21/20
[52] U.S. Cl. ................................... 33/1 N; 33/1 SD;
33/431; 235/61 NV
[58] Field of Search ............ 33/1 SD, 1 N, 403, 419,
33/431, 153 E, 457, 430; 235/61 NV

[56] References Cited

U.S. PATENT DOCUMENTS

| | | | |
|---|---|---|---|
| 2,013,603 | 9/1935 | Dalton | 33/431 |
| 2,216,490 | 10/1940 | Garrett | 33/431 |
| 2,253,279 | 8/1941 | Loew | 33/1 N |
| 3,059,339 | 10/1962 | Danforth | 33/1 SD |

FOREIGN PATENT DOCUMENTS

| | | | |
|---|---|---|---|
| 32924 | 8/1921 | Norway | 33/1 N |
| 8800 | of 1897 | United Kingdom | 33/153 E |
| 581013 | 9/1946 | United Kingdom | 33/431 |

Primary Examiner—William D. Martin, Jr.
Attorney, Agent, or Firm—Bruns & Jenney

[57] ABSTRACT

A direct reading map plotter for converting grid values to magnetic values and vice versa without having to perform arithmetic calculations. The plotter includes a transparent base having a recess formed therein in which is rotatably supported a transparent disc. A compass rose having its center located at the center of rotation of the disc is imprinted upon the base about the periphery of the recess. A heading line representing magnetic north is also imprinted in the base with the line passing through the center of the rose and being arranged to point at the zero mark on the rose. A second diametrical line representing grid north is imprinted upon the disc so that it is caused to turn therewith. A declination scale is provided on the disc which extends to either side of the grid north line whereby the grid north line can be accurately positioned in relation to the magnetic north line.

3 Claims, 2 Drawing Figures

DECLINATION TRANSPOSER

BACKGROUND OF THE INVENTION

This invention relates to an improved map reading plotter and, in particular, to a plotter for providing a direct conversion between grid and magnetic azimuth readings without having to perform arithmetic calculations.

As disclosed by Barry in U.S. Pat. No. 3,126,151 and Gray in U.S. Pat. No. 2,967,016, devices for converting true heading readings to magnetic value or the reverse thereof have been known for quite some time in the art. These devices all take a similar form in that concentric discs of different diameters are rotatably supported upon a common pivot pin. Each disc contains its own compass rose printed thereon that allows the user to set values obtained from some independent source, such as a compass or a chart, into the device. The outer or larger disc generally remains fixed and provides true directional values as typically read from a chart or map. The smaller inner discs provide correction values that are set into the device in various ways to permit comparative readings to be made between the circular scales. As can be seen, these prior art devices operate in the same sense as a circular slide rule whereby the accuracy attained is dependent to a large extent upon the user's ability to make the proper entries and to carry out the proper conversion steps.

While these prior art devices, to some extent, preclude the navigator from having to carry out some arithmetic calculations, and oftentimes reduce the number of factors that might lead to a human error, it should be noted that they are generally only useful as an intermediate aid in processing the conversion between values obtained from a compass or a chart. Gray, in the above-noted patent, attempts to use his device as a plotter by providing it with an extended straight edge. However, because all the elements of the device are constructed of metal or an opaque material, the device itself obstructs the user's view of the chart and thus severely affects the degree of accuracy that can be attained when used as a direct reading instrument. It should also be noted that the disc is secured to a common pivot pin which further limits its value as a direct reading plotter.

SUMMARY OF THE INVENTION

It is therefore an object of this invention to improve navigational plotters.

A further object of the present invention is to apply magnetic compass directional values to a grid chart or to extract the same therefrom without having to perform intermediate arithmetic calculations.

A still further object of the present invention is to provide a simple lightweight navigational plotter that will eliminate the difficulties involved in converting grid and magnetic azimuth readings on intersection and resection problems.

Another object of the present invention is to provide a transparent direct reading plotter that can be simply laid upon a chart so that conversions between grid and magnetic readings can be quickly and accurately made without performing intermediate steps.

Yet another object of the present invention is to save time when working intersection and resection problems in the field.

These and other objects of the present invention are attained by means of a navigation plotter that includes a transparent base having a circular recess formed therein and a transparent disc rotatably supported in the recess so that it can be turned therein about a common center. A compass rose is imprinted about the outer perimeter of the recess with the center of the rose being coaxially aligned with the common center. A heading line representing magnetic north is also inscribed upon the base that passes through the center of the base and is aligned along the north-south axis thereof. A second heading line representing grid north is imprinted along one diameter of the disc. A declination scale is also imprinted upon the disc on both sides of the grid north line that is used to accurately offset the grid north line in relation to the magnetic north line. A manually-operated locking means serves to selectively lock the disc against the base at a desired declination setting.

BRIEF DESCRIPTION OF THE DRAWINGS

For a better understanding of these and other objects of the present invention reference is had to the following detailed description of the invention that is to be read in conjunction with the accompanying drawings, wherein.

DESCRIPTION OF THE INVENTION

Figure 1:
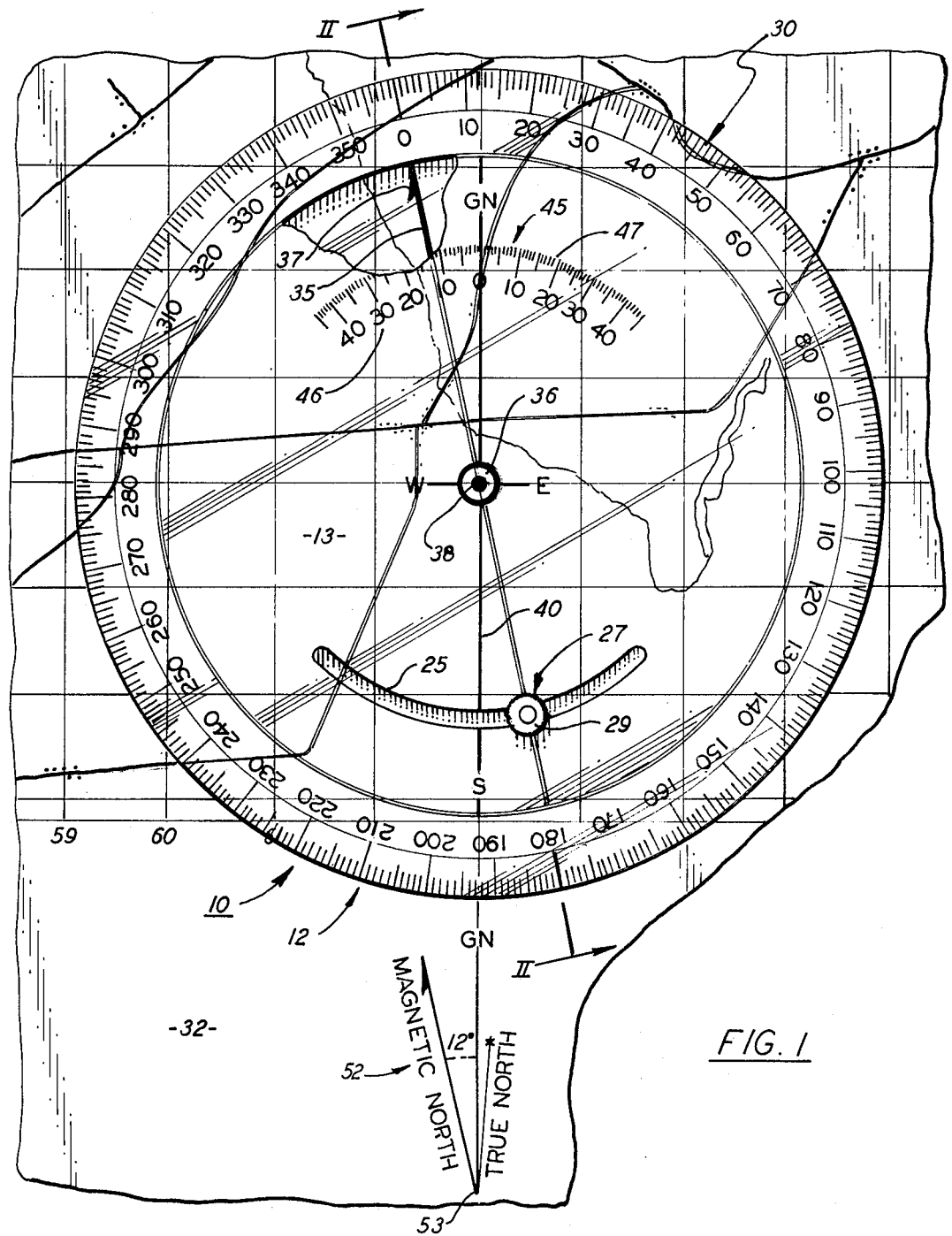
FIG. 1 is a top plan view of a plotter embodying the teachings of the present invention showing the plotter situated upon a military chart.
Figure 2:
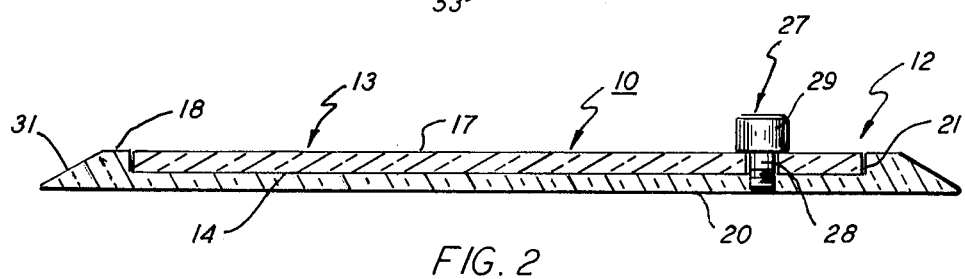
FIG. 2 is a section taken along lines 2—2 in FIG. 1.

The present invention shall be explained in conjunction with a military chart of the type commonly employed on field exercises. However, as should become evident from the disclosure below, the present invention is not limited to this particular application and it can be used as a map reading tool in any number of similar applications. The apparatus of the present invention represents a lightweight, easily portable navigational plotter that is capable of automatically solving declination problems and thus avoid a great deal of the confusion encountered by people in the field when required to work intersection and resection problems under adverse conditions.

The term declination as herein used refers to the angle formed by the magnetic needle of a compass and a line representing grid north found on a chart or a map. Map readers typically do not concern themselves with true north when working field problems. The difference between true north and grid north is generally so small that it can be ignored without seriously affecting the readings. As is well known, the magnetic needle of a compass is attracted to a region in northern Canada that is located some distance from the north pole. As a consequence, magnetic compass reading must be corrected for this difference depending upon where on the earth the compass is located. Applying the proper correction has confused land and sea navigators for centuries.

As shown in the drawings, the plotter of the present invention is generally referenced 10 and consists of two main components that include a circular base section 12 and a disc 13 rotatably within the base. Both the base section and the disc are formed of a lightweight transparent material, preferably high strength plastic, that enables the user to view a chart or map through the device. The importance of this particular feature will become apparent from the disclosure below. The base section is provided with a circular recess 14 that compliments the circular shape of disc 13. In assembly, the disc is seated within the recess with the top surface 17 thereof being substantially flush with the top surface 18 of the base section. The bottom surface 20 of the base section is planar in form so that the instrument can be easily seated upon a flat table or the like.

The disc is accurately formed to provide a close running fit between its outer periphery and the vertical side wall 21 of the recess. This arrangement allows the disc to be rotated easily within the recess of the base section with a minimum amount of lateral movement. An arcuate-shaped slotted hole 25 whose center lies on the center of the disc is accurately formed in the lower portion of the disc and is adapted to receive a locking screw 27 therein. The screw contains a dowel-like shank 28 which, in assembly, is snugly contained within the slotted opening. The screw further contains a knurled head 29 at one end and a screw thread at the other end that is turned into the body of the base section. The slotted hole transcends 90 degrees of arc and thus permits the disc to rotate through a like number of degrees within the recess. The screw, through use of the knurled head, can be tightened against the disc to, in turn, lock the disc against the base section thereby securing the disc in a selected position.

With particular reference to FIG. 1, a compass rose 30 is inscribed by any suitable means about the outer periphery of the base section. As is conventional, the rose is subdivided into 360 degrees of arc by precisely scribed one degree gradations equally spaced about the rose with each ten degrees of arc being appropriately noted. The compass rose graduation lines are situated upon an inclined surface 31 formed along the outer periphery of the base so that the graduation lines are brought down to the surface of an underlying chart, as for example chart 32, as shown in FIG. 1, for ease of reading. By construction, the center of the compass rose lies upon the common center 36 shared by both the base and the disc. A magnetic heading line 35 is also inscribed upon the base section of the instrument. The line is aligned along the north-south axis of the compass rose and contains an arrow 37 that points to the zero indicator mark thereon. As a result of this construction, the magnetic heading line passes through the common center 36 of the instrument.

The compass rose in effect represents a magnetic compass card that can be laid directly upon a chart without obstructing the map reader's view of the material lying thereunder. To facilitate positioning of the instrument upon the chart, a small hole 38 is passed through the instrument along the axis of the common center 36. This hole allows the point of a pencil or the like to be passed through the instrument and thus help the map reader to center the instrument at a desired location on the chart. The size of the hole is sufficiently small that it will not obscure the user's view of the chart nor adversely affect the accuracy of the readings that are taken.

A diametrical line 40 is also inscribed by any suitable means upon the disc which, in practice, represents grid north. The grid north line 40 extends substantially across the entire surface of the disc and, because it represents a diameter of the disc, also passes through the common center 36 of the instrument. Because the magnetic north line is inscribed upon the base and the grid north line upon the disc, rotation of the disc within the recess will produce an angular displacement between the two lines. A declination scale 45 for measuring the angular displacement between the magnetic north line and the grid north line is provided on the face of the disc. The scale is divided into two equal segments 46 and 47 which are positioned to either side of the grid north line. Each segment of the scale is graduated into 45 degrees of arc with the segment scales reading from zero degrees at the grid north line outwardly to a terminal reading of 45 degrees at the outer extremities of the scale.

In practice, the graduations relating to magnetic values that are contained on the body of the plotter are set out in red. These include all markings relating to the compass rose as well as the magnetic heading line. The inscriptions contained on the disc relating to the grid north line and the declination scale in turn are set out in black. Accordingly, the user is provided an unmistakably visual presentation of the magnetic and grid values.

To use the present plotter, the device is placed over the declination diagram 52 situated along the bottom margin of the chart. The center of the plotter is aligned with the intersection point 53 of the lines on the diagram. The thumb screw is loosened and the magnetic north line on the plotter is placed directly over the same line on the diagram. Next, the disc is rotated within the base to bring the grid north line into overlying alignment with the grid north line on the diagram. The thumb screw is then tightened down to lock the plotter in the desired configuration for use with the chart. In this particular case, a declination of 12 degrees west is set into the instrument. This adjustment properly orients the instrument to the chart and thus makes it possible for the navigator to work with identical values on both the compass and the chart without having to make conversions between values.

The declinator transposer of the present invention is intended for use primarily in navigation over land by sportsmen, hunters, hikers, military personnel or the like. Although the device does not consider magnetic distortion caused by the body of a ship, it nevertheless can be used in association with smaller boats particularly those having fiber glass hulls without any appreciable inaccuracies.

While this invention has been described with particular reference to the details as set forth above, it is not limited to the specific structure as disclosed and the invention is intended to cover any modifications or changes as may come within the scope of the following claims.

I claim:

1. An instrument for use in conjunction with a hand held magnetic compass for solving land navigation problems by directly transposing grid and magnetic values when reading or plotting magnetic directional values on a map, the instrument including a transparent circular base having a circular recess formed in its top surface that is coaxially aligned with the axis of the base and a plannar bottom surface whereby the base is seatable in a flat position upon a map having grid lines printed thereon when either plotting or reading azimuths on the map, a transparent circular disc seated in said circular recess that has a close running fit with the sidewalls of the recess whereby the disc rotates in the recess about the axis of said base, said disc and said base both containing a discernible opening that passes through the axis of the instrument whereby the instrument can be quickly and accurately aligned on a map, a compass rose imprinted about the outer periphery of the base having indicating lines representing compass points passing inwardly in a radial direction from the outer edge of the base toward the axis thereof whereby compass headings can be accurately read or plotted on a map, a magnetic north line imprinted upon the base that extends radially from the axis of the base to the zero degree compass rose heading to indicate the zero degree azimuth of a magnetic compass, a grid north line imprinted along a diameter of the disc for orientating the instrument along the north-south grid lines of a map, an angular scale for setting a grid magnetic angle into the instrument, said scale being imprinted upon the disc to either side of the grid north line for accurate displacement of the grid north line from the magnetic north line an amount equal to the grid magnetic angle experienced in the geographic location on the map whereby aligning the grid north line along the north-south grid lines on the map will enable compass azimuth readings to be directly plotted or read from the compass rose without conversion thereby eliminating conversion errors.

2. The instrument of claim 1 wherein the outer edge of the base is bevelled toward the bottom surface so that the indicating lines are read within the bevelled region.

3. The instrument of claim 1 that further includes a threaded fastening means passing through a circular slot formed in said disc for locking the disc against the base and thus holding the disc at a desired setting, said fastening means being radially offset from the axis of the instrument.

* * * * *